United States Patent
Bangel et al.

(10) Patent No.: US 7,743,286 B2
(45) Date of Patent: Jun. 22, 2010

(54) METHOD, SYSTEM AND PROGRAM PRODUCT FOR ANALYZING DEMOGRAPHICAL FACTORS OF A COMPUTER SYSTEM TO ADDRESS ERROR CONDITIONS

(75) Inventors: Matthew J. Bangel, Poughkeepsie, NY (US); Robert G. Madsen, Apalachin, NY (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 11/130,738

(22) Filed: May 17, 2005

(65) Prior Publication Data

US 2007/0006034 A1    Jan. 4, 2007

(51) Int. Cl.
*G06F 11/00*    (2006.01)
(52) U.S. Cl. .......................................... 714/47; 709/224
(58) Field of Classification Search ................... 714/47
See application file for complete search history.

(56) References Cited

U.S. PATENT DOCUMENTS

| | | | | |
|---|---|---|---|---|
| 5,455,932 A | * | 10/1995 | Major et al. ................ 711/162 |
| 5,600,791 A | * | 2/1997 | Carlson et al. ............... 714/47 |
| 5,933,594 A | * | 8/1999 | La Joie et al. ................ 714/26 |
| 6,704,888 B1 | | 3/2004 | Caudrelier et al. ............ 714/37 |
| 7,165,195 B2 | * | 1/2007 | Bedwani .................... 714/704 |
| 7,337,311 B2 | * | 2/2008 | Chen et al. ..................... 713/2 |
| 7,343,524 B2 | * | 3/2008 | Klotz et al. ................... 714/39 |
| 7,369,981 B1 | * | 5/2008 | Saghier et al. ................ 703/22 |
| 7,389,379 B1 | * | 6/2008 | Goel et al. .................. 711/112 |
| 2002/0049687 A1 | * | 4/2002 | Helsper et al. ............... 706/45 |
| 2003/0065970 A1 | * | 4/2003 | Kadam ........................... 714/3 |
| 2003/0074230 A1 | * | 4/2003 | Merkin et al. .................. 705/4 |
| 2003/0081236 A1 | | 5/2003 | Banos et al. |
| 2003/0139905 A1 | * | 7/2003 | Helsper et al. .............. 702/182 |
| 2004/0015950 A1 | | 1/2004 | Dutta et al. |
| 2004/0102927 A1 | | 5/2004 | Yu et al. |
| 2004/0153844 A1 | * | 8/2004 | Ghose et al. .................. 714/42 |

(Continued)

FOREIGN PATENT DOCUMENTS

JP    2003281296    10/2003

OTHER PUBLICATIONS

Nista, Sally A., "Preventing Waste Through Preventive Maintenance," Annual International Conference Proceedings, American Production & Inventory Control Society, 1993, San Antonio, TX, pp. 440-442.

*Primary Examiner*—Scott T Baderman
*Assistant Examiner*—Kamini Patel
(74) *Attorney, Agent, or Firm*—Anne Linne; Hoffman Warnick LLC

(57) ABSTRACT

Under the present invention, when an error condition for the computer system is identified, settings for a series of demographical factors of the computer system are determined. These settings are compared to settings for the demographical factors during at least one previous instance of the error condition to identify a similar error scenario. Then any corrective actions that were taken to address the at least one previous instance of the error conditions are determined and possibly used to resolve the current error condition.

22 Claims, 2 Drawing Sheets

U.S. PATENT DOCUMENTS

| | | | |
|---|---|---|---|
| 2005/0160326 A1* | 7/2005 | Boatright et al. | 714/47 |
| 2005/0246590 A1* | 11/2005 | Lancaster | 714/47 |
| 2006/0010352 A1* | 1/2006 | Mukherjee et al. | 714/47 |
| 2006/0048017 A1* | 3/2006 | Anerousis et al. | 714/47 |
| 2006/0253553 A1* | 11/2006 | Burckart et al. | 709/220 |
| 2007/0101202 A1* | 5/2007 | Garbow | 714/47 |
| 2008/0215727 A1* | 9/2008 | Denis et al. | 709/224 |

* cited by examiner

100

METHOD, SYSTEM AND PROGRAM PRODUCT FOR ANALYZING DEMOGRAPHICAL FACTORS OF A COMPUTER SYSTEM TO ADDRESS ERROR CONDITIONS

BACKGROUND OF THE INVENTION

1. Field of the Invention

The present invention generally relates to resolving computer system error conditions. Specifically, the present invention provides a method, system and program product for analyzing demographical factors of a computer system to address error conditions.

2. Related Art

As the use of computers in business has become more prevalent, there is a growing need to provide proper planning in deciding when/if to upgrade or replace ("refresh") machines. Currently, the upgrading or replacement of a machine is typically driven by its age. That is, when the machine reaches a certain age it is replaced with a newer machine or upgraded with improved hardware and/or software.

Such a method for handling upgrades and replacements fails to take into consideration many other factors that could influence the decision-making process. As such, this methodology could cause a machine to continue in use beyond its practical usefulness, or it could cause a machine that is functioning well to be replaced or upgraded. Moreover, this methodology fails to take into consideration any error conditions the machines might have been experiencing. To this extent, no existing methodology examines error conditions on a machine against a series of factors that could be the cause thereof. If this was done, a more "educated" and cost effective decision could be made in upgrading or replacing a machine.

In view of the foregoing, there exists a need for a method, system and program product for analyzing demographical factors of a computer system to address error conditions of a computer system. Specifically, a need exists whereby when an error condition is identified, certain demographical factors of the computer system are analyzed to determine the cause thereof. Once the cause is determined, the computer system can be upgraded or replaced to resolve the error condition.

SUMMARY OF THE INVENTION

In general, the present invention provides a method, system and program product for analyzing demographical factors of a computer system to address error conditions. Specifically, under the present invention, when an error condition for the computer system is identified, settings for a series of demographical factors of the computer system are determined. These settings are compared to settings for the demographical factors during at least one previous instance of the error condition to identify a similar error scenario. Then, any corrective actions that were taken to address the previous instance(s) of the error conditions are determined and possibly used to resolve the current error condition.

A first aspect of the present invention provides a method for analyzing demographical factors of a computer system to address error conditions, comprising: identifying an error condition for the computer system; analyzing settings for the demographical factors of the computer system to determine a likely cause of the error condition; and determining a corrective action to address the error condition based on the analysis of the settings.

A second aspect of the present invention provides a method for analyzing demographical factors of a computer system to address error conditions, comprising: identifying an error condition for the computer system; determining settings for the demographical factors of the computer system; comparing the settings for the demographical factors at a time of the error condition to settings for the demographical factors during at least one previous instance of the error condition to determine a similar error scenario; and identifying any corrective actions that were taken to address the at least one previous instance of the error conditions.

A third aspect of the present invention provides a system for analyzing demographical factors of a computer system to address error conditions, comprising: an error detection system for identifying an error condition for the computer system; a factor setting system for determining settings for the demographical factors of the computer system; a factor comparison system for comparing the settings for the demographical factors at a time of the error condition to settings for the demographical factors during at least one previous instance of the error condition to identify a similar error scenario; and a corrective action system for identifying any corrective actions that were taken to address the at least one previous instance of the error conditions.

A fourth aspect of the present invention provides a program product stored on a computer readable medium for analyzing demographical factors of a computer system to address error conditions, the computer readable medium comprising program code for performing the following steps: identifying an error condition for the computer system; determining settings for the demographical factors of the computer system; comparing the settings for the demographical factors at a time of the error condition to settings for the demographical factors during at least one previous instance of the error condition to identify a similar error scenario; and identifying any corrective actions that were taken to address the at least one previous instance of the error conditions.

A fifth aspect of the present invention provides a method for deploying an application for analyzing demographical factors of a computer system to address error conditions, comprising: providing a computer infrastructure being operable to: identify an error condition for the computer system; determine settings for the demographical factors of the computer system; compare the settings for the demographical factors at a time of the error condition to settings for the demographical factors during at least one previous instance of the error condition to identify a similar error scenario; and identify any corrective actions that were taken to address the at least one previous instance of the error conditions.

A sixth aspect of the present invention provides computer software embodied in a propagated signal for analyzing demographical factors of a computer system to address error conditions, the computer software comprising instructions to cause a computer system to perform the following steps: identify an error condition for the computer system; determine settings for the demographical factors of the computer system; compare the settings for the demographical factors at a time of the error condition to settings for the demographical factors during at least one previous instance of the error condition to identify a similar error scenario; and identify any corrective actions that were taken to address the at least one previous instance of the error conditions.

A seventh aspect of the present invention provides a business method for analyzing demographical factors of a computer system to address error conditions.

Therefore, the present invention provides a method, system and program product for analyzing demographical factors of a computer system to address error conditions.

BRIEF DESCRIPTION OF THE DRAWINGS

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE DRAWINGS

As indicated above, the present invention provides a method, system and program product for analyzing demographical factors of a computer system to address error conditions. Specifically, under the present invention, when an error condition for the computer system is identified, settings for a series of demographical factors of the computer system are determined. These settings are compared to settings for the demographical factors during at least one previous instance of the error condition to identify a similar error scenario. Then, any corrective actions that were taken to address the previous instance(s) of the error conditions are determined and possibly used to resolve the current error condition.

Figure 1:
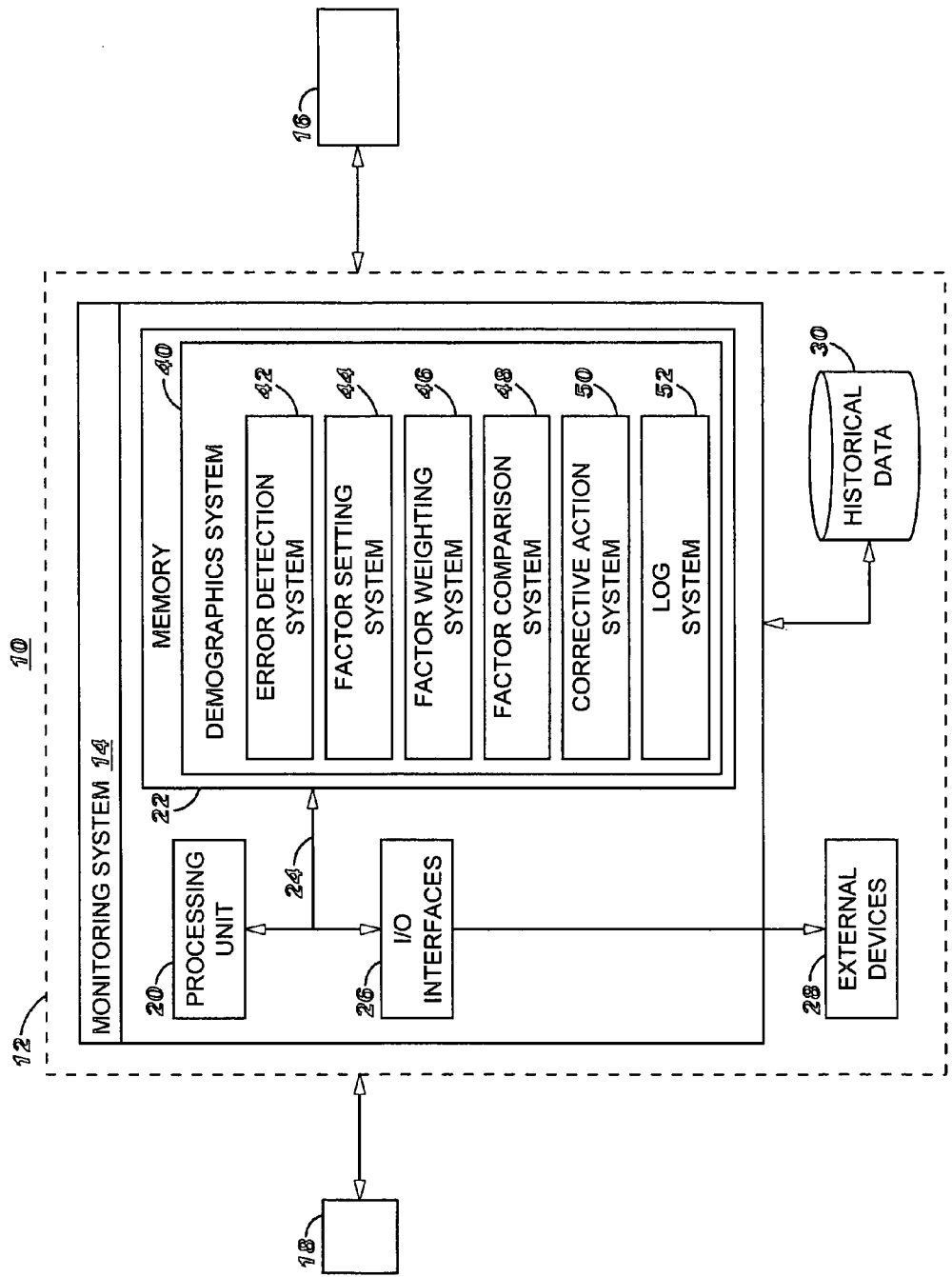
FIG. 1 shows an illustrative system for analyzing demographical factors of a computer system to address error conditions according to the present invention.

Referring now to FIG. 1, a system 10 for analyzing demographical factors of a computer system 16 to address error conditions according to the present invention is shown. As depicted, system 10 includes a computer infrastructure 12, which comprises a monitoring (computer) system 14 that communications with computer system 16. As will be further described below, monitoring system 14 will analyze demographical factors of computer system 16 to address error conditions thereof. To this extent, monitoring system 14 and computer system 16 are intended to represent any type of computer systems capable of carrying out the teachings of the present invention. Examples include a laptop computer, a desktop computer, a workstation, a handheld device. In addition, as will be further described below, monitoring system 14 can be deployed and/or operated by a service provider that is analyzing demographical factors of computer system 16 to address error conditions for an organization. To this extent, it should be understood that monitoring system 14 and computer system 16 could both be implemented within a common infrastructure such as infrastructure 12. They are shown separately to illustrate that monitoring system 14 could be independent from computer system 16. Moreover, although not shown, monitoring system 14 could be part of a larger computer infrastructure that includes any combination of other hardware (e.g., servers and clients) and software.

Monitoring system 14 and computer system 16 can communicate directly, or over a network (e.g., the Internet, a wide area network (WAN), a local area network (LAN), a virtual private network (VPN), etc. In the case of the latter, communication between monitoring system 14 and computer system 16 can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

In any event, monitoring system 14 is shown including a processing unit 20, a memory 22, a bus 24, and an input/output (I/O) interfaces 26. Further, monitoring system 14 is shown in communication with external I/O devices/resources 28 and storage system 30. In general, processing unit 20 executes computer program code, such as demographics system 40, which is stored in memory 22 and/or storage system 30. While executing computer program code, processing unit 20 can read and/or write data, to/from memory 22, storage system 30, and/or I/O interfaces 26. Bus 24 provides a communication link between each of the components in monitoring system 14. External devices 28 can comprise any devices (e.g., keyboard, pointing device, display, etc.) that enable a user to interact with monitoring system 14 and/or any devices (e.g., network card, modem, etc.) that enable monitoring system 14 to communicate with one or more other computing devices, such as computer system 16

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, monitoring system 14 is only representative of various possible computer infrastructures that can include numerous combinations of hardware. To this extent, in other embodiments, monitoring system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in monitoring system 14. However, if monitoring system 14 comprises a handheld device or the like, it is understood that one or more external devices 28 (e.g., a display) and/or storage system(s) 30 could be contained within monitoring system 14, not externally as shown.

Storage system 30 can be any type of system (e.g., a database) capable of providing storage for information under the present invention. Such information can include, for example, historical data, demographical settings, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into monitoring system 14. Moreover, although not shown for brevity purposes, computer system 16 will likely contain computerized components similar to monitoring system 14.

Shown in memory 22 of monitoring system 14 is demographics system 40, which includes error detection system 42, factor setting system 44, factor weighting system 46, factor comparison system 48, corrective action system 50, and log system 52. Operation of each of these systems is discussed further below. However, it is understood that some of the various systems shown in FIG. 1 can be implemented independently, combined, and/or stored in memory for one or more separate computers systems that communicate over a network. Further, it is understood that some of the systems/functionality may not be implemented and/or additional systems/functionality may be included as part of the present invention. Still yet, it is understood that the depiction of these systems shown in FIG. 1 is illustrative only and that the same functionality could be achieved with a different configuration. That is, the functionality of these systems could be combined into fewer systems, or broken down into additional systems.

Under the present invention, demographics system 40 will analyze demographical factors of computer system 16 to address any error conditions thereof. As used herein, the term error condition can apply to both hardware and software error conditions of computer system. In addressing such error conditions, computer system 16 can be upgraded (e.g., hardware and/or software upgrades) or replaced/refreshed. In any event, assume that computer system 16 is experiencing an error condition. Such error condition can be any type known in the art such as hardware or software crashes, traps, drops of network communications, etc. Ultimately, some type of corrective action will be taken to address the error condition. As mentioned above, such corrective actions often include upgrading or replacing computer system 16. The error condition will be observed or otherwise identified by error detection system 42. Specifically, error detection system 42 can be configured to monitor computer system 16 and automatically detected and identify error conditions. Alternatively, the specific error condition can be identified to error detection system 42 based upon administrator 18 input. Regardless, when the error condition is identified, factor setting system 44 will determine settings for various demographical factors of computer system 16. Under the present invention, such demographical factors include both qualitative and quantitative factors.

Shown below is a non-exhaustive list of demographical factors whose settings can be determined by factor setting system 44:

A type of computer system 16;
A model of computer system 16;
A serial number of computer system 16;
An operating system loaded on computer system 16;
A level of the operating system loaded on computer system 16;
An amount of memory in computer system 16;
An age of computer system 16;
A type of processor in computer system 16;
A speed of the processor in computer system 16;
A size of a hard drive in computer system 16;
Adapter cards present in computer system 16;
System software present in computer system 16;
Application software present in computer system 16;
A location of computer system 16;
An age of computer system 16; and
A type of user of computer system 16.

As can be seen, the factors analyzed under the present invention go well beyond simply measuring the age of computer system 16, and can generally include any factors that affect computer system 16 (or the operation and/or performance thereof). Quantitative factors such as the job type of a user of computer system 16 can influence how a machine is managed. For example, "power users" such as developers typically require a machine that is more powerful than would a user who uses the machine for word processing. Settings for these demographical factors could be determined by analysis of computer system 16 by factor setting system 44 and/or consultation of a resource (e.g., in storage system 30) by factor setting system 44.

Regardless, factor setting system 44 will typically be programmed to assign a numeric value to each of the above demographical factors. For factors that are qualitative such as a type of operating system loaded on computer system 16, numeric values could be assigned to each of the possibilities. For example, Linux could be assigned a value of 10, Windows could be assigned a value of 20, etc. (similar concepts could be applied to versions of operating systems such as Windows XP).

In any event, once the settings/values for the demographical factors have been determined, factor weighting system 46 can weight each factor. Specifically, each setting can be assigning a relative score or weighting factor. For example, the value for type of operating system could be weighted by a factor of 0.10. Once each setting has been weighted, a composite score for the demographical factors can be computed based thereon. For example, each weighted setting could be summed to yield the composite score. After the composite score has been computed, factor comparison system 48 will compare the composite score to the composite scores computed pursuant to at least one previous instance of the error condition. For example, assume that the error condition currently identified is that a high number of network communications are being dropped. Factor comparison system 48 will search historical data (e.g., as maintained in storage system 30) for similar or matching composite scores that were computed during previous instance(s) of network communications being dropped. This will provide a multi-point matching process. A first matching point is based on the type of error condition (e.g., network communications being dropped), and a second matching point is based on the composite scores. To this extent, the historical data could be maintained in one or more tables or the like that associates error conditions with scores (i.e., the demographical factors) as well as corrective actions that were taken to address those error conditions. It should be noted that a computer system having a composite score similar or identical to computer system is most likely similar in hardware and software to computer system 16 and thus, will provide an optimal point of reference. Shown below is an illustrative table of historical data for an error condition of network communications being dropped:

| COMPUTER SYSTEM | ERROR CONDITION | COMPOSITE SCORE | CORRECTIVE ACTIONS |
|---|---|---|---|
| A | Network Communications Dropped | 27 | Replace Network Card |
| B | Network Communications Dropped | 29 | Replace Network Card; Replace Ethernet Cable. |

Once one or more similar or identical composite scores have been identified, corrective action system 50 will identify any corrective actions that were taken to address any previous instance(s) of the error condition. For example, assume that computer systems "A" and "B" had previously experienced the error condition. Further assume that computer systems "A" and "B" had composite scores similar or identical to computer system 16. In this case, corrective action system 50 would identify (e.g., from the historical data) the corrective action(s) that were taken for computer systems "A" and "B" to address the error condition. Such corrective action(s) could then be implemented for computer system 16. Once this was done, log system 52 could log the error condition, scoring and corrective actions for computer system 16 as additional historical data for future reference. It should be understood that in identifying a similar or identical composite score, factor comparison system 48 could be programmed with a particular threshold (e.g., a specific value, percentage, etc.) so that only scores within that threshold would be identified as "matching." For example, if factor comparison system 48 was programmed with a threshold of "2" only composite scores within "2" of the composite score for computer system 16 would be identified as "matching." If computer system 16's composite score was "26," then only computer system "A" would be identified by factor comparison system 48 (based on the above illustrative table). Corrective action system 50 would then identify the corrective action taken for computer system "A," namely, "Replace Network Card" and would not identify "Replace Ethernet Cable," which was a corrective action taken for computer system "B."

It should be appreciated that although in a typical embodiment, the settings for the demographical factors are weighted and a composite score is computed that is compared to previous composite scores, this need not be the case. That is, factor comparison system could compare the set of "raw" demographical settings for computer system 16 to a set of "raw" demographical settings present during previous instance(s) of the error condition.

ILLUSTRATIVE EXAMPLES

Shown below are a few illustrative scenarios in which the present invention can be applied:

IBM Thinkpads, model 770, running Windows 95 with token ring card "ABC" are generating a high proportion of machine traps.

Lotus Notes version 6.02a, running Windows XP professional at the Austin, Tex. facility is generating a large number of calls complaining of crashes of the Lotus Notes application.

All IBM desktop machines with Ethernet card "XYZ," running Windows 2000 are periodically seeing extended drops of network communications.

In applying the teachings of the present invention as described above, administrator 18 may elect to upgrade the level of application software for the machines in question, apply an operating system fix patch, upgrade a hardware component, or replace all machines affected.

It should be appreciated that, although the demographical analysis of present invention can be used to determine corrective actions such as upgrades and replacements for individual machines, it can also be used in a similar or identical fashion for trend analysis of a larger scale number of machines. For example, if machines in Division A break down more than those in Division B, the demographical analysis of the present invention could be used in the future deployment of machines in Division A (e.g., so that a heavier volume of machines are deployed in the future). Along these lines, error detection system 42 could be programmed to detect trends in error conditions. The above-table could be added to or augmented with causes of such error conditions as well as actions/deployment instructions that should be implemented in response such trends or to avoid such trends in the future.

Figure 2:
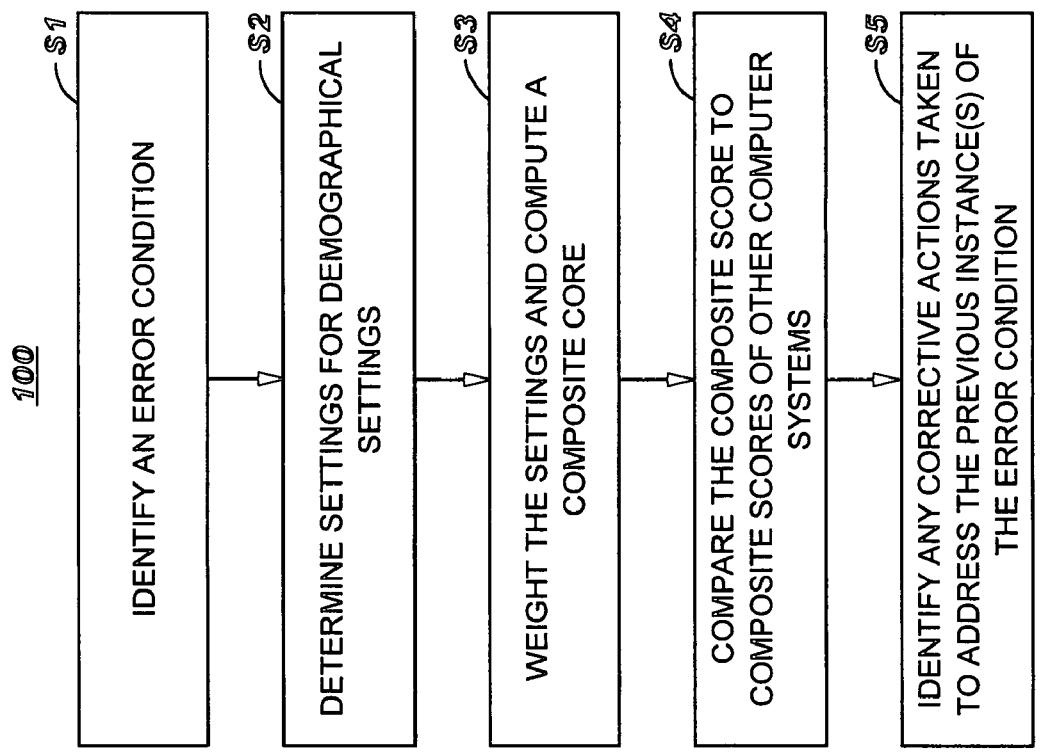
FIG. 2 shows an illustrative method flow diagram according to the present invention.

Referring to FIG. 2, a method flow diagram 100 according to the present invention is shown. First step S1 is to identify an error condition for the computer system. Second step is to determine settings for demographical factors of the computer system. Third step S3 is to weight the settings and compute a composite score. Fourth step S4, is to compare the composite score to composite scores of other computer systems for at least one previous instance of the error condition. Fifth step S5 is to identifying any corrective actions that were taken to address the previous instance(s) of the error conditions.

While shown and described herein as a method and system for analyzing demographical factors of a computer system to address error conditions, it is understood that the invention further provides various alternative embodiments. For example, in one embodiment, the invention provides a computer-readable medium that includes computer program code to enable a computer infrastructure to analyze demographical factors of a computer system to address error conditions. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to analyze demographical factors of a computer system to address error conditions as described above. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for analyzing demographical factors of a computer system to address error conditions. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as monitoring system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for analyzing a computer system, the method comprising:
   an analysis computer system obtaining an identification of an error condition for the computer system;
   the analysis computer system comparing settings for a plurality of demographical factors of the computer system with information corresponding to settings for the plurality of demographical factors of at least one additional computer system previously having the identified error condition in response to obtaining the identification of the error condition for the computer system, the plurality of demographical factors including a plurality of system component demographical factors, each system component demographical factor corresponding to at least one of: a hardware component or a software component of the computer system, and the setting of each system component demographical factor indicating at least one of: an age or a capability of the corresponding hardware or software component of the computer system; and
   the analysis computer system determining a set of previous corrective actions taken to address the error condition for at least one additional computer system having similar demographical factors based on the comparison of the settings.

2. The method of claim 1, further comprising the analysis computer system acquiring the settings for the plurality of demographical factors of the computer system from current settings of the computer system in response to obtaining the identification of the error condition.

3. The method of claim 1, further comprising the analysis computer system providing the set of previous corrective actions for use by a user.

4. The method of claim 1, wherein the corrective action is selected from a group consisting of: upgrading at least one of: a hardware component or a software component of the computer system and replacing the computer system.

5. The method of claim 1, the plurality of demographical factors further including at least one user demographical factor, the setting of the at least one user demographical factor corresponding to types of operations expected of the computer system.

6. The method of claim 1, wherein each setting of the plurality of demographical factors is a numeric value, the comparing including:
   generating a composite score for the computer system by combining the settings of the plurality of demographical factors; and
   identifying a record corresponding to each of the at least one additional computer system using the composite score for the computer system and a composite score corresponding to the at least one additional computer system when it had the identified error condition.

7. The method of claim 6, wherein the generating includes:
   applying a relative weight to each of the settings of the plurality of demographical factors; and
   combining the weighted values of each of the settings of the plurality of demographical factors.

8. The method of claim 6, wherein the identifying includes identifying each of the at least one additional computer system having a composite score that is within a threshold above or below the composite score of the computer system.

9. The method of claim 1, further comprising:
   the analysis computer system receiving a corrective action taken to address the error condition on the computer system; and
   the analysis computer system generating and storing a record including: information corresponding to the identified error condition, information corresponding to the corrective action taken, and information corresponding to the settings for the plurality of demographical factors of the computer system.

10. A method for analyzing a computer system, the method comprising:
    an analysis computer system obtaining settings for a plurality of demographical factors of the computer system based on current settings of the computer system in response to an identification of an error condition for the computer system, wherein each setting of the plurality of demographical factors is a numeric value, and wherein the plurality of demographical factors includes a plurality of system component demographical factors, each system component demographical factor corresponding to at least one of: a hardware component or a software component of the computer system, and the setting of each system component demographical factor corresponding to at least one of: an age or a capability of the corresponding hardware or software component of the computer system;
    the analysis computer system generating a composite score for the computer system by combining the settings of the plurality of demographical factors;
    the analysis computer system identifying a record corresponding to each of at least one additional computer system previously having the identified error condition using the composite score for the computer system and a composite score corresponding to the at least one additional computer system when it had the identified error condition; and
    the analysis computer system determining a set of previous corrective actions taken to address the error condition for at least one additional computer system having similar demographical factors based on the identified at least one record.

11. A system comprising:
    at least one computing device configured to analyze a computer system by performing a method including:
        obtaining an identification of an error condition for the computer system;
        comparing settings for a plurality of demographical factors of the computer system with information corresponding to settings for the plurality of demographical factors of at least one additional computer system previously having the identified error condition in response to obtaining the identification of the error condition for the computer system, the plurality of demographical factors including a plurality of system component demographical factors, each system component demographical factor corresponding to at least one of: a hardware component or a software component of the computer system, and the setting of each system component demographical factor indicating at least one of: an age or a capability of the corresponding hardware or software component of the computer system; and determining a set of previous corrective actions taken to address the error condition for at least one additional computer system having similar demographical factors based on the comparison of the settings.

12. The system of claim 11, the method further including acquiring the settings for the plurality of demographical factors of the computer system from current settings of the computer system in response to obtaining the identification of the error condition.

13. The system of claim 11, the method further including providing the set of previous corrective actions for use by a user.

14. The system of claim 11, the plurality of demographical factors further including at least one user demographical factor, the setting of the at least one user demographical factor corresponding to types of operations expected of the computer system.

15. The system of claim 11, the method further including:
receiving a corrective action taken to address the error condition on the computer system; and
generating and storing a record including: information corresponding to the identified error condition, information corresponding to the corrective action taken, and information corresponding to the settings for the plurality of demographical factors of the computer system.

16. A program product stored on at least one computer readable storage medium, the program product including program code, which when executed by a computing device, implements a method for analyzing a computer system, the method including:
obtaining an identification of an error condition for the computer system;
comparing settings for a plurality of demographical factors of the computer system with information corresponding to settings for the plurality of demographical factors of at least one additional computer system previously having the identified error condition in response to obtaining the identification of the error condition for the computer system, the plurality of demographical factors including a plurality of system component demographical factors, each system component demographical factor corresponding to at least one of: a hardware component or a software component of the computer system, and the setting of each system component demographical factor indicating at least one of: an age or a capability of the corresponding hardware or software component of the computer system; and
determining a set of previous corrective actions taken to address the error condition for at least one additional computer system having similar demographical factors based on the comparison of the settings.

17. The program product of claim 16, the method further including acquiring the settings for the plurality of demographical factors of the computer system from current settings of the computer system in response to obtaining the identification of the error condition.

18. The program product of claim 16, the method further including providing the set of previous corrective actions for use by a user.

19. The program product of claim 16, the plurality of demographical factors further including at least one user demographical factor, the setting of the at least one user demographical factor corresponding to types of operations expected of the computer system.

20. The program product of claim 16, wherein each setting of the plurality of demographical factors is a numeric value, the comparing including:
generating a composite score for the computer system by combining the settings of the plurality of demographical factors; and
identifying a record corresponding to each of the at least one additional computer system using the composite score for the computer system and a composite score corresponding to the at least one additional computer system when it had the identified error condition.

21. The program product of claim 16, the method further including:
receiving a corrective action taken to address the error condition on the computer system; and
generating and storing a record including: information corresponding to the identified error condition, information corresponding to the corrective action taken, and information corresponding to the settings for the plurality of demographical factors of the computer system.

22. A method of configuring a computer infrastructure, the method comprising:
configuring at least one computing device in the computer infrastructure to analyze a computer system by performing a method including:
obtaining an identification of an error condition for the computer system;
comparing settings for a plurality of demographical factors of the computer system with information corresponding to settings for the plurality of demographical factors of at least one additional computer system previously having the identified error condition in response to obtaining the identification of the error condition for the computer system, the plurality of demographical factors including a plurality of system component demographical factors, each system component demographical factor corresponding to at least one of: a hardware component or a software component of the computer system, and the setting of each system component demographical factor indicating at least one of: an age or a capability of the corresponding hardware or software component of the computer system; and
determining a set of previous corrective actions taken to address the error condition for at least one additional computer system having similar demographical factors based on the comparison of the settings.

* * * * *